(12) United States Patent
Nakamoto et al.

(10) Patent No.: US 9,309,404 B2
(45) Date of Patent: Apr. 12, 2016

(54) REINFORCED THERMOPLASTIC RESIN COMPOSITION AND MOLDED ARTICLE

(71) Applicant: UMG ABS, LTD., Tokyo (JP)

(72) Inventors: Masahito Nakamoto, Ube (JP); Koichi Tezuka, Ube (JP); Hideichiro Kawaguchi, Ube (JP)

(73) Assignee: UMG ABS, LTD., Tokyo (JP)

( * ) Notice: Subject to any disclaimer, the term of this patent is extended or adjusted under 35 U.S.C. 154(b) by 150 days.

(21) Appl. No.: 14/099,673

(22) Filed: Dec. 6, 2013

(65) Prior Publication Data

US 2014/0093682 A1  Apr. 3, 2014

Related U.S. Application Data

(63) Continuation of application No. PCT/JP2012/064838, filed on Jun. 8, 2012.

(30) Foreign Application Priority Data

Jun. 10, 2011 (JP) ................................. 2011-130156
May 30, 2012 (JP) ................................. 2012-123592

(51) Int. Cl.

| C08L 69/00 | (2006.01) |
| B29C 45/00 | (2006.01) |
| C08L 55/02 | (2006.01) |
| C08J 5/04 | (2006.01) |
| C08J 5/10 | (2006.01) |
| C08K 5/521 | (2006.01) |
| C08K 9/04 | (2006.01) |
| C08L 63/00 | (2006.01) |

(52) U.S. Cl.
CPC .............. *C08L 69/00* (2013.01); *B29C 45/00* (2013.01); *C08J 5/045* (2013.01); *C08J 5/10* (2013.01); *C08L 55/02* (2013.01); *C08J 2355/02* (2013.01); *C08J 2369/00* (2013.01); *C08K 5/521* (2013.01); *C08K 9/04* (2013.01); *C08L 63/00* (2013.01); *Y10T 428/24355* (2015.01)

(58) Field of Classification Search
CPC .................. Y10T 428/24355; C08L 69/00
See application file for complete search history.

(56) References Cited

U.S. PATENT DOCUMENTS

| 6,369,142 B1 | 4/2002 | Nodera et al. |
| 2004/0152808 A1 | 8/2004 | Tezuka et al. |

FOREIGN PATENT DOCUMENTS

| CN | 1513028 A | 7/2004 |
| CN | 1946780 A | 4/2007 |
| CN | 101910297 A | 12/2010 |
| JP | 60088062 | 5/1985 |
| JP | 06049344 | 2/1994 |
| JP | 2001151974 A | 6/2001 |
| JP | 2001240738 A | 9/2001 |
| JP | 2004115605 A | 4/2004 |
| JP | 2009155577 A | 7/2009 |
| JP | 2009275172 | 11/2009 |
| JP | 2010015091 | 1/2010 |
| JP | 2010144129 A | 7/2010 |
| JP | 2010195935 A | 9/2010 |
| TW | 200838819 A | 10/2008 |
| WO | 2011037172 A1 | 3/2011 |

OTHER PUBLICATIONS

International Search Report with Translation Application No. PCT/JP2012/064838 Completed: Aug. 30, 2012; Mailing Date: Sep. 11, 2012 2 pages.
Notice of Reasons for Rejection from Japan Application No. 2012-123592 Mailing Date: Dec. 2, 2012 8 pages.
The Taiwan Intellectual Property Office 1st Office Action Application No. 10320205760 Dispatch Date: Feb. 18, 2014 8 pages.
The Taiwan Intellectual Property Office 1st Office Action Application No. 101120750 Dispatch Date: Feb. 18, 2014 8 pages.
State Intellectual Property Office of the People's Republic of China First Office Action—Application No. 201280027769.1 Mailing Date: Sep. 2, 2014 16 pages.
Notice of Reasons for Rejection from Japan Application No. 2012-123592 Mailing Date: Dec. 2, 2014 8 pages.

*Primary Examiner* — William P Watkins, III
(74) *Attorney, Agent, or Firm* — St Onge Steward Johnson and Reens LLC

(57) ABSTRACT

A reinforced thermoplastic resin composition containing: 50 to 90% by weight of a polycarbonate resin; 10 to 50% by weight of a graft copolymer in which a polymer including an aromatic alkenyl compound monomer unit and a vinyl cyanide compound monomer unit is grafted to a rubber polymer; 61 to 129 parts by weight of a grass fiber which has been surface-treated with a water-soluble polyurethane, relative to the total of 100 parts by weight of the polycarbonate resin and the graft copolymer; 0.5 to 20 parts by weight of a glycidyl ether unit-containing polymer; and 10 to 40 parts by weight of a phosphoric acid ester-based flame-retardant agent.

5 Claims, No Drawings

REINFORCED THERMOPLASTIC RESIN COMPOSITION AND MOLDED ARTICLE

FIELD OF THE INVENTION

The present invention relates to a reinforced thermoplastic resin composition and a molded article that are used as materials for housings of mobile devices such as laptop personal computers, tablet personal computers, mobile phones including smart phones, digital cameras, digital video movies, or the like.

BACKGROUND OF THE INVENTION

Acrylonitrile butadiene styrene (ABS) resins, thermoplastic resin compositions such as polycarbonate resins/ABS resins, or reinforced thermoplastic resin compositions prepared by reinforcing these thermoplastic resin compositions with inorganic fillers have been widely used as the housing materials of mobile devices such as laptop personal computers, tablet personal computers, mobile phones including smart phones, digital cameras, digital video movies, or the like. In general, as a method for producing a housing, an injection molding method in which the above resin compositions can be shaped freely to some extent has been employed.

In recent years, demands have increased for mobile devices to be thinner and more lightweight, and also to satisfactorily withstand the impacts and loads while being placed inside a bag or such containers, and to be capable of non-coating in terms of low cost. In order to satisfy these demands, the resin used for a housing has to have not only high rigidity, high strength and impact resistance, but also ability to mold a molded article having a high frame retardancy and good moldability.

Among the conventionally used resin materials for housings of mobile devices, molded articles composed of the ABS resins or polycarbonate resins/ABS resins that are not reinforced by inorganic fillers have low rigidity and could not meet the demands for thinning of mobile device housings in recent years.

Therefore, reinforced thermoplastic resin compositions to which inorganic fillers such as glass fibers or carbon fibers have been added, such that rigidity thereof is reinforced, have been used as resin materials for housings of mobile devices.

However, although molded articles composed of conventional reinforced thermoplastic resin compositions exhibit high rigidity, they are problematic as a housing material for mobile devices since they are brittle and easily broken.

As a method to overcome the problem, a method of blending an olefin wax having a carboxyl group with a fiber-reinforced polycarbonate resin has been proposed (Patent Document 1).

Further, for the purpose of improving the mechanical strength, a method of using glass fibers in which the surface thereof has been treated with a silane coupling agent and an epoxy resin (Patent Document 2), and a method of using carbon fibers converged by a nylon-based sizing agent (Patent Document 3) have been proposed.

Moreover, for the purpose of improving the plating appearance of the reinforced resin composition, a method of blending an inorganic filler of 0.1 to 60 parts by mass and a glycidyl ether unit-containing polymer have been proposed (Patent Document 4).

CITATION LIST

Patent Documents

[Patent Document 1] Japanese Unexamined Patent Application, First Publication No. 2001-240738

[Patent Document 2] Japanese Unexamined Patent Application, First Publication No. Hei 6-49344

Japanese Unexamined Patent Application, First Publication No. Sho 60-88062

[Patent Document 4] Japanese Unexamined Patent Application, First Publication No. 2009-155577

SUMMARY OF THE INVENTION

However, according to the method described in Patent Document 1, the impact resistance of the molded article can be improved, but there is a problem that the mechanical strength is deteriorated.

According to the methods described in Patent Documents 2 and 3, the impact resistance of the molded article cannot be satisfactorily improved.

According to the method described in Patent Document 4, the rigidity of the molded article is not always satisfactorily obtained, and therefore, the demand for thinning of mobile device housings in recent years cannot be satisfactorily met.

It is considered that the problem is caused due to the law amount of the inorganic filler of 60 parts by weight or less. However, when the amount is increased greater than 60 parts by weight, a problem that the moldability of the reinforced resin composition is deteriorated has been caused.

For the purpose of improving mechanical strength and flame retardancy of the molded article, a method in which epoxy compounds are added have been proposed, as well as the Patent Documents 1 to 4. However, reinforced thermoplastic resin compositions capable of forming a molded article which exhibits improved impact resistance and mechanical strength have not been proposed.

It is an object of the present invention to provide a reinforced thermoplastic resin composition having excellent moldability, and also being capable of improving the rigidity, the impact resistance, mechanical strength and the flame retardancy of the resulting molded article.

In addition, the present invention has another object of providing a molded article having high rigidity, impact resistance, mechanical strength and flame retardancy.

Solution to Problem

The present invention includes the following aspects.

[1] A reinforced thermoplastic resin composition containing: 50 to 90% by weight of a polycarbonate resin (A); 10 to 50% by weight of a graft copolymer (B) in which a polymer (B2) including an aromatic alkenyl compound monomer unit (a) and a vinyl cyanide compound monomer unit (b) is grafted to a rubber polymer (B1), provided that a total amount of the polycarbonate resin (A) and the graft copolymer (B) accounts for 100% by weight; 61 to 129 parts by weight of a grass fiber (D) which has been surface-treated with a water-soluble polyurethane, relative to the total of 100 parts by weight of the polycarbonate resin (A) and the graft copolymer (B); 0.5 to 20 parts by weight of a glycidyl ether unit-containing polymer (E); and 10 to 40 parts by weight of a phosphoric acid ester-based flame-retardant agent (F).

[2] The reinforced thermoplastic resin composition according to the above aspect [1], wherein the aforementioned phosphoric acid ester-based flame retardant (F) has a weight average molecular weight of greater than 326 and not more than 686.

[3] A molded article formed through molding and processing of the reinforced thermoplastic resin composition according to the above aspect [1] or [2].

[4] The molded article according to the above aspect [3], wherein at least part of a surface of the molded article has a concavo-convex shape having a ten-point average roughness of 0.5 to 40 μm defined in accordance with JIS B 0601, and having a surface glossiness at an incidence angle of 60° of 0.5 to 20% defined in accordance with JIS Z 8741.

Advantageous Effects of Invention

The reinforced thermoplastic resin composition of the present invention exhibits excellent moldability, and also being capable of improving the rigidity, impact resistance, mechanical strength and flame retardancy of the resulting molded article.

The molded article of the present invention also has high rigidity, impact resistance, mechanical strength and flame retardancy.

DETAILED DESCRIPTION OF THE INVENTION

Hereafter, the present invention will be described in detail.
[Reinforced Thermoplastic Resin Composition]

The reinforced thermoplastic resin composition of the present invention contains a polycarbonate resin (A), a graft copolymer (B), a glass fiber (D) which has been surface-treated with a water-soluble polyurethane, a glycidyl ether unit-containing polymer (E) and a phosphoric acid ester-based flame-retardant agent (F) as essential components.

Note that in the present description, a component including the polycarbonate resin (A) and the graft copolymer (B) will be referred to as a main resin component (C).

Hereafter, the "molded article" is formed by molding the reinforced thermoplastic resin composition of the present invention.

<Polycarbonate Resin (A)>

The polycarbonate resin (A) is a resin obtained from a dihydroxydiarylalkane and may be optionally branched.

The polycarbonate resin (A) is produced by a known method. For example, this can be produced through a method of reacting a dihydroxy or polyhydroxy compound with phosgene or a carbonate diester, or through a melt polymerization method. In addition, even those recycled from compact discs or the like can also be used.

As the dihydroxydiarylalkane, for example, those having an alkyl group at the ortho position relative to the hydroxy group may be used. Specific examples of preferred dihydroxydiarylalkanes include 4,4'-dihydroxy 2,2'-diphenylpropane (that is, bisphenol A), tetramethyl bisphenol A and bis-(4-hydroxyphenyl)-p-diisopropylbenzene.

In addition, the branched polycarbonate can be produced by substituting a portion, for example, 0.2 to 2 mol %, of the dihydroxy compounds constituting the polycarbonate resin with a polyhydroxy compound. Specific examples of the polyhydroxy compound include phloroglucinol, 4,6-dimethyl-2,4,6-tri-(4-hydroxyphenyl)-heptene, 4,6-dimethyl-2,4,6-tri-(4-hydroxyphenyl)-heptane and 1,3,5-tri-(4-hydroxyphenyl)-benzene.

One type of these polycarbonate resins (A) may be used alone, or two or more types thereof may be mixed for use.

The viscosity average molecular weight (Mv) of the polycarbonate resin (A) is preferably from 15,000 to 35,000. If the viscosity average molecular weight of the polycarbonate resin (A) is 15,000 or higher, the impact resistance of the molded article will be improved. If the viscosity average molecular weight of the polycarbonate resin (A) is 35,000 or lower, the moldability of the reinforced thermoplastic resin composition will be improved.

In addition, the viscosity average molecular weight (Mv) of the polycarbonate resin (A) is more preferably from 17,000 to 25,000, as such a range offers a particularly superior balance of the mechanical strengths and the impact strength of the molded article and the fluidity of the reinforced thermoplastic resin composition.

[Content of Polycarbonate Resin (A)]

The content of the polycarbonate resin (A) in the main resin component (C) is from 50 to 90% by weight, and preferably from 80 to 90% by weight (provided that the total amount of the polycarbonate resin (A) and the graft copolymer (B) accounts for 100% by weight). If the content of the polycarbonate resin (A) is less than 50% by weight, the frame retardancy and the impact resistance of the molded article will decline. If the content of the polycarbonate resin (A) exceeds 90% by weight, the moldability of the reinforced thermoplastic resin composition will decline.

In particular, if the content of the polycarbonate resin (A) is within the range of 80 to 90% by weight, the molded article having excellent surface appearance and weld appearance can be readily obtained.

<Graft Copolymer (B)>

The graft copolymer (B) is a copolymer obtained by graft-polymerizing a polymer (B2) including an aromatic alkenyl compound monomer unit (a) and a vinyl cyanide compound monomer unit (b) in the presence of a rubber polymer (B1). The graft copolymer (B) may be used alone, or two or more types thereof may be used in combination.

[Rubber Polymer (B1)]

Examples of the rubber polymer (B1) in the graft copolymer (B) include a butadiene rubber, a styrene-butadiene rubber, an acrylonitrile-butadiene rubber, an isoprene rubber, a chloroprene rubber, a butyl rubber, an ethylene-propylene rubber, an acryl rubber, an ethylene-propylene-nonconjugated diene rubber, an epichrolohydrin rubber, a diene-acrylic composite rubber, and a silicone (polysiloxane)-acrylic composite rubber. Among these, a butadiene rubber, a styrene-butadiene rubber, an acrylonitrile-butadiene rubber, an acrylic rubber, a diene-acrylic composite rubber and a silicone-acrylic composite rubber are preferred as they provide excellent plating properties of the molded article.

Further, a silicone-acrylic composite rubber is more preferred, as it provides excellent frame retardancy of the molded article.

Here, the diene component of the above diene-acrylic composite rubber contains at least 50% by weight of butadiene units. Specific examples thereof include a butadiene rubber, a styrene-butadiene rubber and an acrylonitrile-butadiene rubber.

The acrylic rubber component in the diene-acrylic composite rubber is prepared by polymerization between an alkyl (meth)acrylate (f) and a polyfunctional monomer (g).

Here, examples of the alkyl (meth)acrylate (f) include alkyl acrylates such as methyl acrylate, ethyl acrylate, n-propyl acrylate, n-butyl acrylate and 2-ethylhexyl acrylate; and alkyl methacrylates such as hexyl methacrylate, 2-ethylhexyl methacrylate and n-lauryl methacrylate. One type of these may be used alone, or two or more types thereof may be used in combination.

Examples of the polyfunctional monomer (g) include allyl methacrylate, ethylene glycol dimethacrylate, propylene glycol dimethacrylate, 1,3-butylene glycol dimethacrylate, 1,4-butylene glycol dimethacrylate, triallyl cyanurate and triallyl isocyanurate. One type of these may be used alone, or two or more types thereof may be used in combination.

Examples of the composite structure of the diene-acrylic composite rubber include a core shell structure in which the periphery of a core layer of a diene-based rubber is covered by an alkyl (meth)acrylate-based rubber, a core shell structure in which the periphery of a core layer of an alkyl (meth)acrylate-based rubber is covered by a diene-based rubber, a structure in which a diene-based rubber and an alkyl (meth)acrylate-based rubber are intertwined with each other, and a copolymer structure in which diene-based monomers and alkyl (meth)acrylate-based monomers are randomly arranged.

The silicone component of the above silicone-acrylic composite rubber is mainly composed of a polyorganosiloxane. Of these, a polyorganosiloxane containing a vinyl polymerizable functional group is preferred. The acrylic rubber component in the silicone-acrylic composite rubber is the same as the acrylic rubber component of the diene-acrylic composite rubber.

Examples of the composite structure of the silicone-acrylic composite rubber include a core shell structure in which the periphery of a core layer of a polyorganosiloxane rubber is covered by an alkyl (meth)acrylate-based rubber, a core shell structure in which the periphery of a core layer of an alkyl (meth)acrylate-based rubber is covered by a polyorganosiloxane rubber, a structure in which a polyorganosiloxane rubber and an alkyl (meth)acrylate-based rubber are intertwined with each other, and a structure in which polyorganosiloxane segments and polyalkyl (meth)acrylate segments are linearly and sterically bound to each other to form a network-like rubber structure.

The rubber polymer (B1) is prepared by, for example, treating the monomers constituting the rubber polymer (B1) with a radical polymerization initiator to effect emulsion polymerization. According to the preparation method by emulsion polymerization, the particle size of the rubber polymer (B1) can be readily controlled.

The average particle size of the rubber polymer (B1) is preferably from 0.1 to 0.6 μm as the impact resistance of the molded article can be improved.

In addition, the content of the rubber polymer (B1) is preferably from 5 to 25% by weight, and more preferably from 5 to 10% by weight, relative to 100% by weight of the main resin component (C). If the content of the rubber polymer (B1) is at least 5% by weight, the impact resistance of the molded article can be improved. If the content is not more than 25% by weight, the moldability will be improved, and consequently, the molded article will have excellent outer appearance.

[Polymer (B2)]

The polymer (B2) includes the aromatic alkenyl compound monomer unit (a) and the vinyl cyanide compound monomer unit (b) as essential components and a monomer unit (c) copolymerizable with these units as an optional component. The composition ratio thereof is not particularly limited, although it is preferable such that the aromatic alkenyl compound monomer unit (a) accounts for 50 to 90% by weight, the vinyl cyanide compound monomer unit (b) accounts for 10 to 50% by weight, and the monomer unit (c) accounts for 0 to 40% by weight (provided that the total amount of (a), (b), and (c) accounts for 100% by weight), as such a ratio offers an excellent balance between the impact resistance of the molded article and the moldability of the reinforced thermoplastic resin composition.

Examples of the aromatic alkenyl compound monomer unit (a) include styrene, α-methylstyrene and vinyltoluene, styrene is preferred.

Examples of the vinyl cyanide compound monomer unit (b) include acrylonitrile and methacrylonitrile, and acrylonitrile is preferred.

Examples of the monomer unit (c) which is copolymerizable with these components include methacrylic acid esters such as methyl methacrylate, ethyl methacrylate and 2-ethylhexyl methacrylate, acrylic acid esters such as methyl acrylate, ethyl acrylate and butyl acrylate, and maleimide compounds such as N-phenylmaleimide.

The weight average molecular weight of the polymer (B2) is preferably from 70,000 to 200,000.

[Acetone-Insoluble Fraction and Acetone-Soluble Fraction of Graft Copolymer (B)]

It is preferable that the graft copolymer (B) contains 70 to 99% by weight of an acetone-insoluble fraction, and also the reduced viscosity of an acetone-soluble fraction measured in a 0.2 g/dl N,N-dimethylformamide solution at 25° C. is 0.3 to 0.7 dl/g. If the acetone-insoluble fraction accounts for at least 70% by weight, the moldability of the reinforced thermoplastic resin composition and the surface appearance of the molded article will be further improved. On the other hand, if the acetone-insoluble fraction accounts for 99% by weight or less, the tear strength of the molded article will be improved.

Moreover, if the above reduced viscosity of the acetone-soluble fraction is 0.3 dl/g or higher, the tear strength of the molded article will be improved. If it is 0.7 dl/g or lower, the moldability of the reinforced thermoplastic resin composition and the surface appearance of the molded article will be further improved.

It should be noted that the measurement method of the acetone-soluble fraction is as follows.

2.5 g of a graft copolymer is immersed in 90 ml of acetone, heated at 65° C. for 3 hours, and then centrifuged at 1,500 rpm for 30 minutes by using a centrifugal separator. Thereafter, the supernatant liquid is discarded. The residue is dried at 65° C. for 12 hours in a vacuum drier, and the resulting sample after drying is precisely weighed. From the weight difference between before and after this process (namely, [2.5 g of graft copolymer]−[sample weight after drying]), the content ratio (%) of the acetone-soluble fraction relative to the graft copolymer can be determined.

The reduced viscosity is measured in a 0.2 g/dl N,N-dimethylformamide solution of the acetone-soluble fraction at 25° C.

Here, the acetone-soluble fraction is a polymer which has the same composition of the polymer (B2), and which is not grafted to the rubber polymer (B1).

The acetone-soluble fraction is frequently produced simultaneously when the polymer (B2) is grafted to the rubber polymer (B1).

[Production Method of Graft Copolymer (B)]

The graft copolymer (B) can be obtained by graft-polymerizing the aromatic alkenyl compound monomer (a) and the vinyl cyanide compound monomer (b), and, if necessary, an additional monomer (c), in the presence of the rubber polymer (B1).

There are no limitations on the polymerization method for the graft copolymer (B), although an emulsion polymerization method is preferred. In addition, various chain transfer agents may also be added during the graft polymerization, so as to adjust the molecular weight and the graft rate of the graft copolymer (B).

The graft copolymer (B) can be produced by, for example, an emulsion polymerization method. Specifically, the components such as the vinyl cyanide compound monomer and the aromatic alkenyl compound monomer are added to the rubber polymer (B1) latex, and a conventional radical polymerization is conducted in the presence of the emulsifier, thereby producing the graft copolymer (B). During the graft polymerization, various chain transfer agents may also be added, so as to adjust the molecular weight and the graft rate of the graft copolymer (B).

As the radical polymerization initiator to be added to the polymerization reaction, peroxides, azo-type initiators and redox-type initiators in which these initiators and an oxidizing agent or a reducing agent are used in combination may be employed. Among these, a redox-type initiator is preferably used, and redox-type initiators such as a combination of ferrous sulfate, sodium pyrophosphate, glucose and hydroperoxide, a combination of ferrous sulfate, sodium pyrophosphate, glucose, sodium dithionite and hydroperoxide, a combination of ferrous sulfate, ethylenediaminetetraacetic acid disodium salt, Rongalite and hydroperoxide are preferably used.

Further, the emulsifier may be added if necessary, or the emulsifier used in the production of a rubber polymer (B1) may be reused without further addition of emulsifier prior to the graft polymerization process. The emulsifier to be added is not particularly limited, and for example, the same emulsifier used in the production of a rubber polymer (B1) can be employed.

[Content of Graft Copolymer (B)]

The content of the graft copolymer (B) in the main resin component (C) is from 10 to 50% by weight, preferably from 10 to 20% by weight, and more preferably from 5 to 10% by weight (provided that the total amount of the component (A) and the component (B) accounts for 100% by weight). If the content of the graft copolymer (B) in the main resin component (C) is less than 10% by weight, the moldability of the reinforced thermoplastic resin composition will be unsatisfactory. If the content exceeds 50% by weight, the flame retardancy and the impact resistance of the molded article formed from the reinforced thermoplastic resin composition will decline.

In particular, if the content of the graft copolymer (B) is within the range of 10 to 20% by weight, the molded article having excellent surface appearance and weld appearance can be readily obtained.

<Glass Fiber (D) Surface-Treated with Water-Soluble Polyurethane>

The glass fiber (D) surface-treated with a water-soluble polyurethane can be obtained by carrying out a surface treatment in which the surface of an untreated glass filter is treated with a water-soluble polyurethane.

Further, before the untreated glass fiber is treated with a water-solubule polyurethane, the untreated glass fiber may be pre-treated with a surface preparation agent such as coupling agents (e.g., a silane coupling agent and a titanate coupling agent).

When the glass fiber subjected to a surface treatment with the preparation agent other than a water-soluble polyurethane is used, the impact resistance and the mechanical strength of the molded article will decline.

Here, the "surface treatment" is conducted by immersing a glass fiber into a water-soluble polyurethane.

As the untreated glass fiber, either a long fiber or a short fiber may be used, and a short fiber having a less anisotropy is preferably used. Further, a chopped fiber is more preferably used.

With respect to the cross-sectional shape of the glass fiber, the ratio of major axis to minor axis of the cross-sectional surface of the fiber (represented by [major axis]/[minor axis]) is preferably 1 to 8, more preferably 2 to 6, and more preferably 2 to 4.

In particular, when the glass fiber having the ratio of major axis to minor axis of 2 to 6 is used, the impact resistance, the mechanical strength and the rigidity of the molded article will be further improved.

Here, the long fiber is a glass fiber having a length of 5 to 20 mm. The short fiber is a glass fiber having a length of 1 to 4 mm.

A single type of glass fibers (D) may be used alone, or two or more types thereof may be used in combination.

The content of the glass fiber (D) surface-treated with a water-soluble polyurethane is from 61 to 129 parts by weight, and preferably from 65 to 105 parts by weight, relative to 100 parts by weight of the main resin component (C). If the content of the glass fiber (D) surface-treated with a water-soluble polyurethane is less than 61 parts by weight, the rigidity of the molded article or the like cannot be improved sufficiently. If the content exceeds 129 parts by weight, the moldability of the reinforced thermoplastic resin composition and the frame retardancy of the molded article will decline.

[Glycidyl Ether Unit-Containing Polymer (E)]

The glycidyl ether unit-containing polymer (E) is a polymer inducing a glycidyl ether unit.

Examples of the polymer include glycidyl ether-type epoxy resins yielded by a reaction between a compound having a hydroxy group and epichlorohydrin.

Examples of the glycidyl ether-type epoxy resins include high molecular weight substances such as bisphenol type epoxy resins, novolac type epoxy resins, polyglycidyl ethers of aliphatic polyhydric alcohols, and biphenyl type epoxy resins, which have a polymer with repeating units represented by the following formula (1) (for example, an epoxy group-containing phenoxy resin).

[Chemical Formula 1]

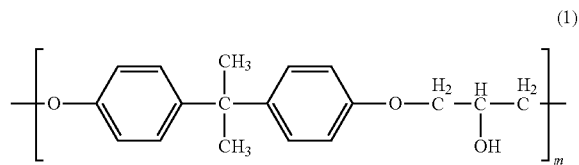

(1)

In the formula (1), m represents an integer of 1 or more.

Furthermore, examples of the bisphenol type epoxy resins include a bisphenol A type epoxy resin, a bisphenol F type epoxy resin, a bisphenol AD type epoxy resin, and an epoxy resin having structures of both bisphenol A and bisphenol F.

Examples of the novolac type epoxy resins include a phenol novolac type epoxy resin and a cresol novolac type epoxy resin.

Examples of the polyglycidyl ethers of aliphatic polyhydric alcohols include alkylene glycol diglycidyl ethers (such as ethylene glycol diglycidyl ether), polyoxyalkylene glycol diglycidyl ethers (such as diethylene glycol diglycidyl ether, polyethylene glycol diglycidyl ether, dipropylene glycol diglycidyl ether, tripropylene glycol diglycidyl ether, and polypropylene glycol diglycidyl ether), and glycerin triglycidyl ether.

A single type of these glycidyl ether-type epoxy resins may be used alone, or two or more types thereof may be used in combination.

A bisphenol A type epoxy resin, a bisphenol F type epoxy resin, an epoxy resin having structures of both bisphenol A and bisphenol F, a phenol novolac type epoxy resin, a cresol novolac type epoxy resin, and an epoxy group-containing phenoxy resin are preferred as the glycidyl ether unit-containing polymers (E). By using these preferred polymers, the mechanical strength of the molded article will be further improved, and the molded article having an excellent surface appearance can be readily obtained.

As the glycidyl ether unit-containing polymer (E), those in the form of a liquid, a semisolid or a solid at normal temperature (20° C.) may be used, although those in a solid state are preferred considering the workability during the extrusion process.

The weight average molecular weight of the glycidyl ether unit-containing polymer (E) is from 3,000 to 200,000, preferably from 4,000 to 60,000, and more preferably from 5,000 to 55,000.

When the weight average molecular weight of the glycidyl ether unit-containing polymer (E) is less than 3,000, the mechanical strength and the impact resistance of the molded article are not satisfactorily improved, and when the weight average molecular weight of the glycidyl ether unit-containing polymer (E) is greater than 200,000, the moldability of the reinforced thermoplastic resin composition is likely to decline.

As the glycidyl ether unit-containing polymer (E), for example, "jER" series manufactured by Mitsubishi Chemical Corporation, "Epototo" series and "Phenototo" series manufactured by Tohto Kasei Co., Ltd., "AER" series manufactured by Asahi Kasei Chemicals Corporation, "Epiclon" series manufactured by DIC, Incorporated, and the like are commercially available.

The content of the glycidyl ether unit-containing polymer (E) is from 0.5 to 20 parts by weight, preferably from 1 to 12 parts by weight, and more preferably from 3 to 9 parts by weight, relative to 100 parts by weight of the main resin component (C). If the content of the glycidyl ether unit-containing polymer (E) is at least 0.5 part by weight, the mechanical strength and the impact resistance of the molded article can be satisfactorily improved, and the molded article having excellent surface appearance and weld appearance can be readily obtained. If the content is not more than 20 parts by weight, the moldability of the reinforced thermoplastic resin composition can be ensured.

<Phosphoric Acid Ester-Based Flame Retardant (F)>

The phosphoric acid ester-based flame retardant is a compound represented by the following formula (2).

[Chemical Formula 2]

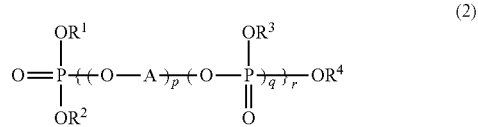
(2)

In the formula (2), each of $R^1$, $R^2$, $R^3$ and $R^4$ independently represents a hydrogen atom or an organic group, provided that not all the $R^1$, $R^2$, $R^3$ and $R^4$ are hydrogen atoms. A represents a divalent or higher organic group, p represents 0 or 1, q represents an integer of 1 or more, and r represents an integer of 0 or more.

Examples of the organic group include an alkyl group which may be substituted (such as a methyl group, an ethyl group, a butyl group and an octyl group), a cycloalkyl group (such as a cyclohexyl group), and an aryl group (such as a phenyl group and a phenyl group substituted with an alkyl group). In addition, the number of substituents, if any, is not limited. Examples of the substituent of the substituted organic group include an alkoxy group, an alkylthio group, an aryloxy group and an arylthio group. In addition, the organic group may be a group in which these substituents are combined (such as an arylalkoxylalkyl group) or a group in which these substituents are combined by bonding through an oxygen atom, a nitrogen atom, a sulfur atom or the like (such as an arylsulfonyl aryl group).

Further, the term "divalent or higher organic group" refers to a divalent or higher functional group obtained by removing two or more hydrogen atoms bonded to carbon atom(s) in the above-mentioned organic group. Examples thereof include an alkylene group and a (substituted) phenylene group. Hydrogen atoms at any position may be removed from the carbon atom(s).

Specific examples of the phosphoric acid ester-based flame retardant (F) include trimethyl phosphate, triethyl phosphate, tributyl phosphate, trioctyl phosphate, tributoxyethyl phosphate, triphenyl phosphate, tricresyl phosphate, trixyl phosphate, cresyl diphenyl phosphate, xyl diphenyl phosphate, octyl diphenyl phosphate, diphenyl-2-ethylcresyl phosphate, tris(isopropylphenyl) phosphate and resorcinyl diphenyl phosphate.

In addition, other examples include polyphosphates such as bisphenol A-bis(dicresyl phosphate), phenylenebis(diphenyl phosphate), phenylenebis(ditolyl phosphate) and phenylenebis(dixylyl phosphate), including bisphenol A bisphosphates, hydroquinone bisphosphates, resorcin bisphosphates and trioxybenzene triphosphates.

Of the above specific examples, trixyl phosphate, phenylenebis(diphenyl phosphate), phenylenebis(dixylyl phosphate), phenylenebis(ditolyl phosphate) and bisphenol A-bis(dicresyl phosphate) are preferred, and phenylenebis(diphenyl phosphate) and phenylenebis(dixylyl phosphate) are more preferred as the phosphoric acid ester-based flame retardant (F).

A single type of these phosphoric acid ester-based flame retardant (F) may be used alone, or two or more types thereof may be used in combination.

Of the phosphoric acid ester-based flame retardants (F), polyphosphates can be obtained by, for example, dehydration and condensation between various diol forms such as polynuclear phenols (for example, bisphenol A) and an orthophosphoric acid. Examples of the diol forms include hydroquinone, resorcinol, diphenylolmethane, diphenyloldimethylmethane, dihydroxybiphenyl, p,p'-dihydroxy diphenyl sulfone and dihydroxynaphthalene.

The weight average molecular weight of the phosphoric acid ester-based flame retardant (F) is preferably at least 326, more preferably greater than 326, and particularly preferably at least 550. If the weight average molecular weight is greater than 326, the moldability of the reinforced thermoplastic resin composition can be improved, and a molded article having excellent outer appearance can be obtained. The upper limit of the weight average molecular weight of the phosphoric acid ester-based flame retardant is preferably not more than 692, more preferably not more than 690, and particularly preferably not more than 686, from the viewpoint of the flame retardancy of the molded article.

That is, the weight average molecular weight of the phosphoric acid ester-based flame retardant (F) is preferably from 326 to 692, more preferably from 326 to 690, still more preferably from 550 to 690, and particularly preferably from 550 to 686.

Here, the weight average molecular weight of the phosphoric acid ester-based flame retardant (F) can be determined in accordance with mass spectrometry, and when a commercially available phosphoric acid ester-based flame retardant (F) is used, the weight average molecular weight recited in a catalog can be applied.

The phosphoric acid ester-based flame retardant (F) is commercially available, and examples of such commercial products include "FP" series manufactured by Adeka Corporation, "Kronitex" series manufactured by Ajinomoto Fine-Techno Co., Inc., "Reofos" series manufactured by Chemtura Japan Ltd., and "CR" series and "PX" series manufactured by Daihachi Chemical Industry Co., Ltd.

The content of the phosphoric acid ester-based flame retardant (F) is preferably from 10 to 40 parts by weight, and more preferably from 20 to 30 parts by weight, relative to 100 parts by weight of the main resin component (C). If the content of the phosphoric acid ester-based flame retardant (F) is less than 10 part by weight, sufficiently frame retardancy cannot be achieved. If the content of the phosphoric acid ester-based flame retardant (F) is greater than 40 parts by weight, the thermal resistance of the molded article is deteriorated, the flame retardancy declines and the impact resistance is likely to decline.

<Other Flame Retardants>

The reinforced thermoplastic resin composition of the present invention may also contain a known non-halogenated flame retardant, in addition to the phosphoric acid ester-based flame retardant (F) so that the both agents can be used in combination. Examples of the non-halogenated flame retardants include inorganic flame retardants such as red phosphorus and aluminum hydroxide.

The red phosphorus-based flame retardant can be used after stabilization by coating with a thermosetting resin either with or without metal hydroxide. Since the red phosphorus-based flame retardant is flammable on its own, it may be mixed with at least a part of the main resin component (C) or the polycarbonate resin (A) in advance to form a master batch.

<Flame Retardant Auxiliary Agent>

The reinforced thermoplastic resin composition of the present invention may also contain a flame retardant auxiliary agent (G) to prevent dripping during combustion. Examples of the flame retardant auxiliary agents include polytetrafluoroethylene, tetrafluoroethylene-containing compounds, and silicone-based polymers.

If polytetrafluoroethylene or a tetrafluoroethylene-containing compound is incorporated as the flame retardant auxiliary agent (G), the amount thereof is preferably 0.5 parts by weight or lower, relative to 100 parts by weight of the main resin component (C), from the viewpoint of the surface appearance.

<Other Components>

The reinforced thermoplastic resin composition of the present invention may also contain another modifier, a mold release agent, a light or thermal stabilizer, an antistatic agent, a dye, a pigment, or the like, if necessary.

As a preferable combination of the polycarbonate resin (A), the graft copolymer (B), the grass fiber (D) which has been surface-treated with a water-soluble polyurethane, the glycidyl ether unit-containing polymer (E) and the phosphoric acid ester-based flame-retardant agent (F), a combination can be mentioned, in which the polycarbonate resin (A) is a resin obtained from 4,4'-dihydroxy-2,2'-diphenylpropane (that is, bisphenol A), tetramethyl bisphenol A, bis-(4-hydroxyphenyl)-p-diisopropylbenzene, phloroglucinol, 4,6-dimethyl-2,4,6-tri-(4-hydroxyphenyl)-heptene, 4,6-dimethyl-2,4,6-tri-(4-hydroxyphenyl)-heptane or 1,3,5-tri-(4-hydroxyphenyl)-benzene; the rubber polymer (B1) in the graft copolymer (B) is a butadiene rubber, a styrene-butadiene rubber, an acrylonitrile-butadiene rubber, an isoprene rubber, a chloroprene rubber, a butyl rubber, an ethylene-propylene rubber, an acryl rubber, an ethylene-propylene-nonconjugated diene rubber, an epichrolohydrin rubber, a diene-acrylic composite rubber or a silicone (polysiloxane)-acrylic composite rubber; the aromatic alkenyl compound monomer unit (a) in the polymer (B2) in the graft copolymer (B) is styrene, α-methylstyrene or vinyltoluene; and the vinyl cyanide compound monomer unit (b) in the polymer (B2) in the graft copolymer (B) is acrylonitrile or methacrylonitrile; the glass fiber (D) surface-treated with water-soluble polyurethane is a chopped fiber; the glycidyl ether unit-containing polymer (E) is bisphenol type epoxy resins, novolac type epoxy resins, polyglycidyl ethers of aliphatic polyhydric alcohols or biphenyl type epoxy resins, which have a polymer with repeating units represented by the aforementioned formula (1); and the phosphoric acid ester-based flame retardant (F) is a compound represented by the aforementioned formula (2).

As a more preferable combination of the polycarbonate resin (A), the graft copolymer (B), the grass fiber (D) which has been surface-treated with a water-soluble polyurethane, the glycidyl ether unit-containing polymer (E) and the phosphoric acid ester-based flame-retardant agent (F), a combination can be mentioned, in which the polycarbonate resin (A) is a resin obtained from 4,4'-dihydroxy-2,2'-diphenylpropane (that is, bisphenol A), tetramethyl bisphenol A, bis-(4-hydroxyphenyl)-p-diisopropylbenzene, phloroglucinol, 4,6-dimethyl-2,4,6-tri-(4-hydroxyphenyl)-heptene, 4,6-dimethyl-2,4,6-tri-(4-hydroxyphenyl)-heptane or 1,3,5-tri-(4-hydroxyphenyl)-benzene; the rubber polymer (B1) in the graft copolymer (B) is a butadiene rubber, a styrene-butadiene rubber, an acrylonitrile-butadiene rubber, an acryl rubber, a diene-acrylic composite rubber or a silicone-acrylic composite rubber; the aromatic alkenyl compound monomer unit (a) in the polymer (B2) in the graft copolymer (B) is styrene; and the vinyl cyanide compound monomer unit (b) in the polymer (B2) in the graft copolymer (B) is acrylonitrile; the glass fiber (D) surface-treated with water-soluble polyurethane is a chopped fiber; the glycidyl ether unit-containing polymer (E) is bisphenol A type epoxy resin, a bisphenol F type epoxy resin, an epoxy resin having structures of both bisphenol A and bisphenol F, a phenol novolac type epoxy resin, a cresol novolac type epoxy resin or an epoxy group-containing phenoxy resin; and the phosphoric acid ester-based flame retardant (F) is trixyl phosphate, phenylenebis(diphenyl phosphate), phenylenebis(dixylyl phosphate), phenylenebis(ditolyl phosphate) or bisphenol A-bis(dicresyl phosphate).

<Production Method>

The reinforced thermoplastic resin composition of the present invention can be obtained by mixing the polycarbonate resin (A), the graft copolymer (B), the glass fiber (D) which has been surface-treated with a water-soluble polyurethane, the glycidyl ether unit-containing polymer (E) and the phosphoric acid ester-based flame retardant (F), and, if necessary, other components, using a mixing device (for example, a Henschel mixer, tumbler mixer, Nauta mixer or the like). The mixture may also be further kneaded using a kneading device (for example, a single screw extruder, a twin screw extruder, a Banbury mixer, a co-kneader, or the like).

As described above, the reinforced thermoplastic resin composition of the present invention contains a specific amount of the polycarbonate resin (A), the graft copolymer (B), the glass fiber (D) which has been surface-treated with a water-soluble polyurethane, the glycidyl ether unit-containing polymer (E) and the phosphoric acid ester-based flame retardant (F), and therefore, it exhibits excellent moldability, and also being capable of improving the rigidity, the impact resistance, the mechanical strength and the frame retardancy of the molded article to be obtained.

<Molded Article>

The molded article of the present invention is formed through molding and processing of the above-mentioned reinforced thermoplastic resin composition.

Examples of the molding and processing method of the reinforced thermoplastic resin composition include an injection molding method, an injection compression molding method, an extrusion molding method, a blow molding method, a vacuum molding method, an air-pressure molding method, a calendar molding method and an inflation molding method. Among these, an injection molding method and an injection compression molding method are preferred, since they are superior in terms of mass production and are capable of yielding molded articles of highly precise dimensions.

With respect to the molded article of the present invention, at least part of the surface of the molded article preferably has a concavo-convex shape having a ten-point average roughness (Rz) of 0.5 to 40 μm defined in accordance with JIS B 0601. When the Rz value is at least 0.5 μm, the surface appearance and weld appearance of the molded article become excellent. When the Rz value is no more than 40 μm, since it is possible to reduce the draft angle of a molded article having a side shape, the possibility of the shape of the molded article is expanded. The Rz value is more preferably from 3.0 to 30 μm.

The concavo-convex shape is not particularly limited, and for example, shapes such as grain pattern, pearskin pattern, skin pattern, hairline pattern, woodgrain pattern and geometric pattern.

With respect to the molded article of the present invention, the surface glossiness Gs (60°) at incidence angle of 60° is preferably 0.5 to 20% defined in accordance with JIS Z 8741. When the Gs (60°) value is at least 0.5%, the resistance to damage of the molded article is enhanced. When the Gs (60°) value is no more than 20%, the surface appearance and weld appearance of the molded article become excellent. The Gs (60°) value is more preferably from 1 to 18%.

The molded article having the concavo-convex shape in which the Rz value is within the aforementioned range on at least part of the surface thereof, and having the Gs (60°) value of the surface thereof within the aforementioned range can be produced, by conducting molding the reinforced thermoplastic resin composition of the present invention through a molding method such as injection molding, with the mold having the concavo-convex shape in which the Rz value is from 0.5 to 40 μm defined in accordance with JIS B 0601, and the Gs (60°) value of the surface is 0.5 to 20%.

Such a mold can be obtained by conducting one or more processes such as etching, blasting, polishing, cutting, discharging, electrocasting and ion plating in combination, such that at least the portion of the surface of mold corresponding to the molded article to be designed has a desired shape. Among these processes, in terms of controlling the Rz value of the molded article, etching process is preferable, and in terms of controlling the Gs (60°) value, blasting process is preferable. When the mold is used in producing a molded article, the process of the surface of the mold is not limited, as long as a molded article having the Rx value and Gs (60°) value within the aforementioned range can be obtained.

As described above, the molded article of the present invention exhibits excellent rigidity, impact resistance, mechanical strength and flame retardancy, since the molded article is produced by molding the reinforced thermoplastic resin composition of the present invention.

And now, with respect to the molded article, a good surface appearance is often required. The molded article obtained by molding the conventional reinforced thermoplastic resin composition has the rigidity due to the inorganic filler, but there is a case where the inorganic filler may appear on the surface of the molded article and therefore the surface appearance is deteriorated.

In order to obtain a molded article having a good balance between high rigidity and good surface appearance, it is effective to blend a carbon fiber which can provide high rigidity even with small amount as an inorganic filler. The reinforced thermoplastic resin composition containing carbon fibers is suitable for obtaining a thin molded article. However, due to black carbon fibers, the Coloration of the molded article is limited. Further, it is difficult to obtain a uniform color appearance. Moreover, in recent mobile devices, communication features such as wireless LAN has been employed, and since the reinforced thermoplastic resin composition containing carbon fibers which has conductivity loses the permeability of radio wave, it is also difficult to obtain a housing as one integral part.

The problem about the permeability of radio wave can be solved by blending inorganic fillers such as glass fibers which do not have conductivity. However, in order to obtain satisfactory rigidity corresponding to the rigidity of the reinforced thermoplastic resin composition containing carbon fibers, there is a need to add a large amount of inorganic fillers. As a result, the appearance of the inorganic fillers on the surface of the molded article is frequently observed, and the surface appearance of the molded article is likely to be deteriorated.

In order to obtain a reinforced thermoplastic resin composition capable of suppressing the appearance of the inorganic fillers on the molded article and improving the surface appearance of the molded article, a crystalline resin such as polyamide resin can be used as a base polymer. However, since the crystalline resin has a low viscosity during melting, a burr is likely to occur during molding. Furthermore, since the degree of shrinkage of the crystalline resin is large due to recrystallization during cooling process, the warpage is likely to occur in the resulting molded article. The molded article having a warpage is needed to be corrected by heating treatment using a correction jig such that the molded article can be assembled, and therefore, the production efficiency becomes poor because of a great deal of effort.

However, by producing a molded article using the reinforced thermoplastic resin composition of the present invention, such that at least part of the surface of the molded article has a concavo-convex shape having Rz of 0.5 to 40 μm and Gs (60° C.) of the surface of the molded article becomes 0.5 to 20%, a molded article having excellent surface appearance and weld appearance, as well as excellent rigidity, impact resistance, mechanical strength and flame retardancy, can be obtained.

The molded article of the present invention can be applied to, for example: housings of a personal computer (including a laptop type and a tablet type), a projector (including a liquid crystal projector), a television set, a printer, a fax machine, a copying machine, audio equipment, a game machine, a camera (including a video camera, a digital camera, and the like), filming equipment such as video equipment, musical instruments, a portable device (such as an electronic diary and a personal digital assistant (PDA)), lighting equipment, and a communication device such as a telephone (including a mobile phone and a smart phone); fishing goods; play equipment such as pinball goods; products for vehicles; products for furniture; products for sanitation; and products for building materials. Among these applications, suitable application is a housing of mobile devices such as a laptop personal computer, a tablet type personal computer, a portable device such as a smart phone, or the like because the effects of the present invention can be especially exploited.

EXAMPLES

Hereunder, specific examples are shown. The present invention is in no way limited by these examples. In addition, in the following description, the units "parts" and "%" refer to "parts by weight" and "% by weight", respectively.

In the following example, the following components were used.

[Polycarbonate Resin (A)]

The "Novarex 7021PJ" manufactured by Mitsubishi Engineering-Plastics Corporation was used as the polycarbonate resin (A).

[Production of Graft Copolymer (B1-1)]

2 parts (in terms of solid content) of a copolymer latex having an average particle size of 0.08 µm consisting of 85% of an n-butyl acrylate unit and 15% of a methacrylic acid unit were added, with stirring, to 100 parts (in terms of solid content) of a polybutadiene latex having an average particle size of 0.08 µm at a solid content concentration of 35%. Subsequently, the mixture was kept stirred for 30 minutes, thereby yielding an enlarged butadiene-based rubber polymer latex having an average particle size of 0.28 µm.

The yielded enlarged butadiene-based rubber polymer latex was placed in a reaction vessel, to which 100 parts of distilled water, 4 parts of a wood rosin emulsifier, 0.4 parts of Demol N (product name of naphthalene sulfonate formaldehyde condensate manufactured by Kao Corporation), 0.04 parts of sodium hydroxide, and 0.7 parts of dextrose were further added. Subsequently, the mixture was heated under stirring. When the internal temperature reached 60° C., 0.1 part of ferrous sulfate, 0.4 parts of sodium pyrophosphate, and 0.06 parts of sodium dithionite were added. Then, a mixture containing the following components was continuously added dropwise over 90 minutes. The resultant product was allowed to stand for 1 hour and then was cooled down.

| | |
|---|---|
| Acrylonitrile | 30 parts |
| Styrene | 70 parts |
| Cumene hydroperoxide | 0.4 parts |
| tert-dodecylmercaptan | 1 part |

The thus yielded graft copolymer latex was coagulated with dilute sulfuric acid. The coagulated product was then washed, filtered, and dried, thereby yielding a graft copolymer (B1-1) in the form of a dried powder.

The acetone-soluble fraction of this graft copolymer (B1-1) was 27%. In addition, the reduced viscosity of this acetone-soluble fraction was 0.3 dl/g.

It should be noted that the method for measuring the acetone-soluble fraction is as follows.

2.5 g of a graft copolymer was immersed in 90 ml of acetone, heated at 65° C. for 3 hours, and then centrifuged at 1,500 rpm for 30 minutes by using a centrifugal separator. Thereafter, the supernatant liquid was discarded. The residue was dried at 65° C. for 12 hours in a vacuum drier, and the resulting sample after drying was precisely weighed. From the weight difference between before and after this process (namely, [2.5 g of graft copolymer]−[sample weight after drying]), the content ratio (%) of the acetone-soluble fraction relative to the graft copolymer was determined.

The reduced viscosity was measured in a 0.2 g/dl N,N-dimethylformamide solution at 25° C.

[Production of Graft Copolymer (B1-2)]

Raw materials at the following proportions were charged in a reaction vessel and polymerized under stirring with nitrogen substitution at 50° C. for 4 hours, thereby yielding a rubber latex.

| | |
|---|---|
| n-butyl acrylate | 98 parts |
| 1,3-butylene glycol dimethacrylate | 1 part |
| Allyl methacrylate | 1 part |
| Sodium dioctylsulfosuccinate | 2.0 parts |
| Deionized water | 300 parts |
| Potassium persulfate | 0.3 parts |
| Disodium phosphate dodecahydrate | 0.5 parts |
| Sodium hydrogen phosphate dodecahydrate | 0.3 parts |

100 parts (in terms of solid content) of the thus yielded rubber latex was charged in a separate reaction vessel and diluted by adding 280 parts of ion exchanged water thereto, and the resulting diluted product was heated to 70° C.

Separately, 0.7 parts of benzoyl peroxide was dissolved in 100 parts of a monomer mixture composed of acrylonitrile/styrene=29/71 (weight ratio), and the mixture was subjected to nitrogen substitution. Then, this monomer mixture was added at a rate of 30 parts/hour by a metering pump into the reaction vessel which contained the above-mentioned rubber latex. After all the monomers were added, the temperature inside the reaction vessel was raised to 80° C., and the mixture was kept stirred for 30 minutes, thereby yielding a graft copolymer latex. The polymerization rate was 99%

The above graft copolymer latex was charged into a coagulation bath which contained an aqueous solution of 0.15% aluminum chloride ($AlCl_3 \cdot 6H_2O$) (90° C.) at a three times greater amount than the total amount of the latex, under stirring to effect coagulation. After all the latex was added, the temperature inside the coagulation bath was raised to 93° C., and the mixture was allowed to stand for 5 minutes. This was cooled down, and then liquid was discarded therefrom by using a centrifugal separator. The resulting product was washed and then dried, thereby yielding a graft copolymer (B1-2) in the form of a dried powder.

The acetone-soluble fraction of this graft copolymer (B1-2) was 21%. In addition, the reduced viscosity of this acetone-soluble fraction was 0.70 dl/g.

[Production of Graft Copolymer (B1-3)]

A graft copolymer (B1-3) including a composite rubber of polybutadiene/polybutyl acrylate as a rubber polymer was obtained by the method described below.

0.4 parts (in terms of solid content) of a copolymer latex having an average particle size of 0.10 µm composed of 82% of an n-butyl acrylate unit and 18% of a methacrylic acid unit were added, with stirring, to 20 parts (in terms of solid content) of a polybutadiene latex having an average particle size of 0.08 µm at a solid content concentration of 35%. Subsequently, the mixture was kept stirred for 30 minutes, thereby yielding an enlarged diene-based rubber latex having an average particle size of 0.36 µm.

20 parts (in terms of solid content) of the thus yielded enlarged diene-based rubber latex were placed in a reaction vessel, to which 1 part of disproportionated potassium rosinate, 150 parts of ion exchanged water, and a monomer mixture having the following composition were added. The resulting product was subjected to nitrogen substitution and then heated to 50° C. (internal temperature). Furthermore, a solution having 0.0002 parts of ferrous sulfate, 0.0006 parts of disodium ethylenediaminetetraacetate, and 0.25 parts of Rongalite dissolved in 10 parts of ion exchanged water was added into the reaction vessel, to effect a reaction.

n-butyl acrylate 80 parts
Allyl methacrylate 0.32 parts
Ethylene glycol dimethacrylate 0.16 parts The internal temperature at the completion of the reaction was 75° C. The solution was further heated up to 80° C., and the reaction was kept continued for 1 hour, thereby yielding a composite rubber of the enlarged diene-based rubber and the polybutyl acrylate-based rubber. The polymerization rate was 98.8%.

Subsequently, 50 parts (in terms of solid content) of the composite rubber latex of the enlarged diene-based rubber and the polybutyl acrylate-based rubber were placed in a reaction vessel, which was then diluted by adding 140 parts of ion exchanged water thereto. The resulting diluted solution was heated to 70° C.

Separately, 0.35 parts of benzoyl peroxide were dissolved in 50 parts of a monomer mixture composed of acrylonitrile/styrene=29/71 (weight ratio), and the mixture was subjected to nitrogen substitution. This monomer mixture was added at a rate of 15 parts/hour by a metering pump into the reaction vessel which contained the above-mentioned rubber latex. After all the monomers were added, the temperature inside the reaction vessel was raised to 80° C., and the mixture was kept stirred for 30 minutes, thereby yielding a graft copolymer latex. The polymerization rate was 99%.

The above graft copolymer latex was charged into a coagulation bath which contained a 0.5% aqueous solution of sulfuric acid (90° C.) at a three times greater amount than the total amount of the latex, under stirring to effect coagulation. After all the latex was added, the temperature inside the coagulation bath was raised to 93° C., and the mixture was allowed to stand for 5 minutes. This was cooled down, and then liquid was discarded therefrom by using a centrifugal separator. The resulting product was washed and then dried, thereby yielding a graft copolymer (B1-3) in the form of a dried powder.

The acetone-soluble fraction of this graft copolymer (B1-3) was 20%. In addition, the reduced viscosity of this acetone-soluble fraction was 0.7 dl/g.

[Production of Graft Copolymer (B1-4)]

A graft copolymer (B1-4) including a composite rubber of polysiloxane rubber/polybutyl acrylate as a rubber polymer was obtained by the method described below.

96 parts of octamethyltetracyclosiloxane, 2 parts of γ-methacryloxypropyldimethoxymethylsilane, and 2 parts of ethyl orthosilicate were mixed to yield 100 parts of a siloxane-based mixture. 300 parts of distilled water having 0.67 parts of sodium dodecylbenzene sulfonate dissolved therein were added to this mixture. The resulting mixture was stirred by a homomixer at 10000 revolutions/2 minutes, and was then homogenized once at a pressure of 30 MPa by a homogenizer, thereby yielding a stable premixed organosiloxane latex.

In addition, 2 parts of dodecylbenzenesulfonate and 98 parts of distilled water were charged in a reaction vessel equipped with a reagent injection container, a cooling tube, a jacket heater and a stirring device, by which an aqueous solution of 2% dodecylbenzenesulfonate was prepared. While heating this aqueous solution to 85° C., the premixed organosiloxane latex was dropwise added thereto over 4 hours. After the completion of the dropwise addition, the solution was kept at this temperature for 1 hour, and was then cooled down.

The reaction solution was allowed to stand at room temperature for 48 hours and was then neutralized with an aqueous solution of sodium hydroxide, thereby yielding a polyorganosiloxane latex (L-1). A portion of the polyorganosiloxane latex (L-1) was dried at 170° C. for 30 minutes to obtain the solid content concentration. The thus obtained solid content concentration was 17.3%.

Subsequently, 119.5 parts of the polyorganosiloxane latex (L-1) and 0.8 parts of sodium polyoxyethylene alkyl phenyl ether sulfate were charged in a reaction vessel equipped with a reagent injection container, a cooling tube, a jacket heater, and a stirring device. Subsequently, 203 parts of distilled water was added and mixed therein. Then, a mixture composed of 53.2 parts of n-butyl acrylate, 0.21 parts of allyl methacrylate, 0.11 parts of 1,3-butylene glycol dimethacrylate, and 0.13 parts of tertiary butyl hydroperoxide was added thereto. A nitrogen gas was let to flow through this reaction vessel so as to substitute the inside atmosphere with nitrogen, and the temperature was raised to 60° C. When the internal temperature of the reaction vessel reached 60° C., an aqueous solution having 0.0001 parts of ferrous sulfate, 0.0003 parts of disodium ethylenediaminetetraacetate, and 0.24 parts of Rongalite dissolved in 10 parts of distilled water was added to initiate radical polymerization. Due to the polymerization of the acrylate components, the temperature of the solution increased to 78° C. This state was maintained for 1 hour to complete the polymerization of the acrylate components, thereby yielding a composite rubber latex of polyorganosiloxane and a butyl acrylate rubber.

After the solution temperature inside the reaction vessel decreased to 60° C., an aqueous solution having 0.4 parts of Rongalite dissolved in 10 parts of distilled water was added. Subsequently, a mixed solution including 11.1 parts of acrylonitrile, 33.2 parts of styrene, and 0.2 parts of tertiary butyl hydroperoxide was dropwise added thereto over about 1 hour to effect polymerization. After the completion of the dropwise addition, the resulting mixture was allowed to stand for 1 hour, and an aqueous solution having 0.0002 parts of ferrous sulfate, 0.0006 parts of disodium ethylenediaminetetraacetate, and 0.25 parts of Rongalite dissolved in 10 parts of distilled water was then added thereto. Subsequently, a mixed solution including 7.4 parts of acrylonitrile, 22.2 parts of styrene, and 0.1 parts of tertiary butyl hydroperoxide was dropwise added thereto over about 40 minutes to effect polymerization. After the completion of the dropwise addition, the resulting mixture was allowed to stand for 1 hour, and was then cooled down, thereby yielding a graft copolymer latex in which an acrylonitrile-styrene copolymer was grafted onto the composite rubber composed of polyorganosiloxane and the butyl acrylate rubber.

Subsequently, 150 parts of a 5% aqueous solution of calcium acetate was heated to 60° C. and stirred. 100 parts of the graft copolymer latex was gradually dropwise added into this aqueous solution of calcium acetate to effect coagulation. The resulting coagulated product was separated, washed, and then dried, thereby yielding a graft copolymer (B1-4) in the form of a dried powder.

The acetone-soluble fraction of this graft copolymer (B1-4) was 26%. In addition, the reduced viscosity of this acetone-soluble fraction was 0.60 dl/g.

[Inorganic Filler (D)]

The "CS 3PE-455" (surface treatment agent: water-soluble polyurethane, the ratio represented by [major axis]/[minor axis]=1)) which was chopped fibers made of glass fibers and manufactured by Nitto Boseki Co., Ltd. was used as a glass fiber (D-1).

The "CSG 3PA-820" (surface treatment agent: water-soluble polyurethane, the ratio represented by [major axis]/

[minor axis]=4) which was chopped fibers made of glass fibers and manufactured by Nitto Boseki Co., Ltd. was used as a glass fiber (D-2).

The "CS 3PA-937" (surface treatment agent: water-soluble epoxy, the ratio represented by [major axis]/[minor axis]=1) which was chopped fibers made of glass fibers and manufactured by Nitto Boseki Co., Ltd. was used as a glass fiber (D-3).

The "CSF3PE-957" (surface treatment agent:water-soluble polyolefin, the ratio represented by [major axis]/[minor axis]:1) which was chopped fibers made of glass fibers and manufactured by Nitto Boseki Co., Ltd. was used as a glass fiber (D-4).

[Glycidyl Ether Unit-Containing Polymer (E)]

The "jER 4250" (weight average molecular weight: 60,000) manufactured by Mitsubishi Chemical Co., Ltd. was used as a glycidyl ether unit-containing polymer (E-1).

The "jER 1256" (weight average molecular weight: 50,000) manufactured by Mitsubishi Chemical Co., Ltd. was used as a glycidyl ether unit-containing polymer (E-2).

The "jER 1010" (weight average molecular weight: 5,500) manufactured by Mitsubishi Chemical Co., Ltd. was used as a glycidyl ether unit-containing polymer (E-3).

The "jER 1009" (weight average molecular weight: 3,800) manufactured by Mitsubishi Chemical Co., Ltd. was used as a glycidyl ether unit-containing polymer (E-4).

The "jER 1004" (weight average molecular weight: 1,650) manufactured by Mitsubishi Chemical Co., Ltd. was used as a glycidyl ether unit-containing polymer (E-5). [0079]

[Phosphoric Acid Ester-Based Flame Retardant (F)]

The "PX-200" (weight average molecular weight: 686, catalogue value) manufactured by Daihachi Chemical Industry Co., Ltd. was used as a phosphoric acid ester-based flame retardant (F-1).

The "CR-733S" (weight average molecular weight: 574, catalogue value) manufactured by Daihachi Chemical Industry Co., Ltd. was used as a phosphoric acid ester-based flame retardant (F-2).

The "TPP" (weight average molecular weight: 326, catalogue value) manufactured by Daihachi Chemical Industry Co., Ltd. was used as a phosphoric acid ester-based flame retardant (F-3).

The "BAPP" (weight average molecular weight: 692, catalogue value) manufactured by Ajinomoto Fine-Techno Co., Inc. was used as a phosphoric acid ester-based flame retardant (F-4).

[Other Components]

Polytetrafluoroethylene (PTFE) was used as a flame retardant auxiliary agent (G).

In addition, with respect to Comparative Example 6 described below, an olefin based wax having a carboxy group (product name: "DIACARNA-30", manufactured by Mitsubishi Chemical Co., Ltd.) was blended instead of a glycidyl ether unit-containing polymer (E).

Examples 1 to 25, Comparative Examples 1 to 11

Each of the components described above was mixed, as indicated in Tables 1 to 3, to obtain a reinforced thermoplastic resin composition. With respect to the each of the obtained reinforced thermoplastic resin compositions, the Charpy impact strength, the flexural strength, the flexural modulus, the flame retardancy, the moldability and the surface condition of the molded article (e.g., the ten-point average roughness, the surface glossiness, the surface appearance and the weld appearance) were evaluated in the following manners. The evaluation results are shown in Tables 1 to 3.

[Evaluation of Charpy Impact Strength]

The Charpy impact strength was measured in accordance with ISO 179.

[Evaluation of Flexural Strength and Flexural Modulus]

The flexural strength and flexural modulus were measured in accordance with ISO 178.

Here, the flexural strength is an index of the mechanical strength, and the flexural modulus is an index of the rigidity.

[Evaluation of Flame Retardancy]

A test piece (having a width of 12.7 mm, a length of 127 mm and a thickness of 1.0 mm) was prepared by molding the reinforced thermoplastic resin composition, and subjected to a vertical flame test in accordance with UL94 as described below, thereby evaluating the flame retardancy.

<Vertical Flame Test>

A burner flame was applied to the lower end of the aforementioned test piece which was vertically supported and kept there for 10 seconds, and then the burner flame was removed from the test piece. After the flame was extinguished, the burner flame was reapplied and the same operation was carried out. The evaluation was made based on the flaming combustion time after the first contact with the flame, the total of the second flaming combustion time and the flameless combustion time, and the presence or absence of fallen objects due to the combustion. The outline of the criteria for each grade in the UL94 standard is as follows.

V-0: The first flaming combustion time of not more than 10 seconds; the total of the second flaming combustion time and the flameless combustion time of not more than 30 seconds; with no fallen objects due to the combustion.

V-1: The first flaming combustion time of more than 10 seconds but not more than 30 seconds; the total of the second flaming combustion time and the flameless combustion time of more than 30 seconds but not more than 60 seconds; with no fallen objects due to the combustion.

V-2: The first flaming combustion time of more than 10 seconds but not more than 30 seconds; the total of the second flaming combustion time and the flameless combustion time of more than 30 seconds but not more than 60 seconds; with fallen objects due to the combustion.

With respect to Examples 1 to 25 and Comparative Examples 1 to 11, the flame retardancy is expressed by the following symbols in Tables 1 to 3.

⊚; The flame retardancy was in the V-0 level.

○; The flame retardancy was in the V-1 level.

Δ; The flame retardancy was in the V-2 level.

x; The flame retardancy was below the V-2 level.

[Evaluation of Moldability]

A liquid crystal display housing having a general box shape of 80×125×5 mm, an open portion and a thickness of 1.0 mm was molded by the injection molding machine (J75EIIP with a 75 t accumulator, manufactured by The Japan Steel Works, LTD.) in the molding conditions in which the molding temperature was 280° C., the injection rate was 99%, and the mold temperature was 80° C. The moldability was evaluated based on the occurrence of short shot (unfilled portions) and the occurrence of corrosion by gas during the molding.

○: No unfilled portion was observed.

Δ: Unfilled portions were partially observed.

x: Either one or both of unfilled portions and corrosion by gas was observed.

The mold used for molding a molded article has a nested structure in the cavity portion to be designed surface. By changing the nested structure, the concavo-convex shape of the surface of the molded article can be changed.

The molded article is molded using four pin gates arranged for forming plus shape, and weld lines occurs in the vicinity of four corners of the molded article.

The mold employs a fixed side protrusion method such that the gate mark and the protrusion pin mark are arranged in the same surface.

The concavo-convex shapes of the surface of the molds are shown below. The "M-1" is a shape formed by polishing the surface of the mold with #400 to form a semi-gloss surface. Each of the "M-2" to "M-4" is a shape formed by conducting grain finish, and manufactured by Mold-Tech Japan Co., Ltd. The "M-5" is a shape formed by polishing the surface of the mold with #800 to form a mirror surface.

Mold surface shape 1 (M-1): semi-gloss surface (depth: 0.5 mm)

Mold surface shape 2 (M-2): MTJ-101 (depth: 3 μm)

Mold surface shape 3 (M-3): MTJ-106 (depth: 16 μm)

Mold surface shape 4 (M-4): MTJ-204 (depth: 30 μm)

Mold surface shape 5 (M-5): gloss surface (mirror surface)

[Evaluation of Surface Condition of Molded Article]

Among the prepared molded articles, the molded articles having evaluated as "○" in the evaluation of moldability, the ten-point average roughness and the surface glossiness were measured in the following manners. The surface appearance and the weld appearance were respectively evaluated.

<Evaluation of Ten-Point Average Roughness>

With respect to the surface of the molded article, the ten-point average roughness (Rz) defined in accordance with JIS B 0601 was measured, by capturing images of the surface shape of the molded article, which had been taken using a laser microscope (manufactured by KEYENCE Corp., "VK-8500"), and using an application for VK shape analysis.

<Evaluation of Surface Glossiness>

The surface glossiness (Gs) of the molded article at incidence angle of 60° defined in accordance with JIS Z 8741 was measured, by using a digital strange angle gloss meter (manufactured by Suga Test Instruments Co., Ltd., product name: "UGV-5D").

<Evaluation of Surface Appearance>

The surface appearance of the molded article was visually observed, and evaluated in accordance with the following evaluation standards.

○: There was no transcription unevenness of the surface such as an appearance of glass fibers on the surface.

x: There was transcription unevenness of the surface such as an appearance of glass fibers on the surface.

<Evaluation of Weld Appearance>

The weld appearance of the molded article was visually observed, and evaluated in accordance with the following evaluation standards.

○: There was no difference in surface appearance between non-weld portions and weld portions.

x: There was a difference in surface appearance between non-weld portions and weld portions.

TABLE 1

| Example No. | | | | | 1 | 2 | 3 | 4 | 5 | 6 |
|---|---|---|---|---|---|---|---|---|---|---|
| C | A | | | % | 90 | 90 | 90 | 90 | 90 | 90 |
| | B | B1-1 | | % | 0 | 0 | 0 | 0 | 0 | 0 |
| | | B1-2 | | % | 0 | 0 | 0 | 0 | 0 | 0 |
| | | B1-3 | | % | 0 | 0 | 0 | 0 | 0 | 0 |
| | | B1-4 | | % | 10 | 10 | 10 | 10 | 10 | 10 |
| D-1 | | | | parts | 105 | 105 | 105 | 105 | 105 | 65 |
| D-2 | | | | parts | 0 | 0 | 0 | 0 | 0 | 0 |
| D-3 | | | | parts | 0 | 0 | 0 | 0 | 0 | 0 |
| D-4 | | | | parts | 0 | 0 | 0 | 0 | 0 | 0 |
| E-1 | | | | parts | 0 | 0 | 0 | 0 | 0 | 0 |
| E-2 | | | | parts | 9 | 9 | 9 | 9 | 9 | 9 |
| E-3 | | | | parts | 0 | 0 | 0 | 0 | 0 | 0 |
| E-4 | | | | parts | 0 | 0 | 0 | 0 | 0 | 0 |
| E-5 | | | | parts | 0 | 0 | 0 | 0 | 0 | 0 |
| F-1 | | | | parts | 20 | 20 | 20 | 20 | 20 | 20 |
| F-2 | | | | parts | 0 | 0 | 0 | 0 | 0 | 0 |
| F-3 | | | | parts | 0 | 0 | 0 | 0 | 0 | 0 |
| F-4 | | | | parts | 0 | 0 | 0 | 0 | 0 | 0 |
| G | | | | parts | 0.5 | 0.5 | 0.5 | 0.5 | 0.5 | 0.5 |
| Evaluation | Charpy impact strength | | | kJ/m² | 12 | 12 | 12 | 12 | 12 | 13 |
| | Flexural strength | | | MPa | 221 | 221 | 221 | 221 | 221 | 203 |
| | Flexural modulus | | | MPa | 12600 | 12600 | 12600 | 12600 | 12600 | 9700 |
| | Flame retardancy | | | — | ◎ | ◎ | ◎ | ◎ | ◎ | ◎ |
| | Moldability | Mold surface shape | | — | M-1 | M-2 | M-3 | M-4 | M-5 | M-3 |
| | | Evaluation | | — | ○ | ○ | ○ | ○ | ○ | ○ |
| | Surface condition of molded article | Ten point average roughness | | μm | 0.5 | 3.0 | 14.3 | 28.5 | 0.3 | 14.5 |
| | | Grossiness (60°) | | % | 17.7 | 1.7 | 1.5 | 1.1 | 43.0 | 1.6 |
| | | Surface appearance | | — | ○ | ○ | ○ | ○ | ○ | ○ |
| | | Weld appearance | | — | ○ | ○ | ○ | ○ | X | ○ |
| Example No. | | | | | 7 | 8 | 9 | 10 | 11 | 12 |
| C | A | | | % | 50 | 70 | 80 | 90 | 90 | 90 |
| | B | B1-1 | | % | 0 | 0 | 0 | 0 | 0 | 0 |
| | | B1-2 | | % | 0 | 0 | 0 | 0 | 0 | 0 |
| | | B1-3 | | % | 0 | 0 | 0 | 0 | 0 | 0 |
| | | B1-4 | | % | 50 | 30 | 20 | 10 | 10 | 10 |

TABLE 1-continued

|  |  |  |  |  |  |  |  |  |
|---|---|---|---|---|---|---|---|---|
| D-1 |  |  | parts | 105 | 105 | 105 | 105 | 105 | 105 |
| D-2 |  |  | parts | 0 | 0 | 0 | 0 | 0 | 0 |
| D-3 |  |  | parts | 0 | 0 | 0 | 0 | 0 | 0 |
| D-4 |  |  | parts | 0 | 0 | 0 | 0 | 0 | 0 |
| E-1 |  |  | parts | 0 | 0 | 0 | 9 | 0 | 0 |
| E-2 |  |  | parts | 9 | 9 | 9 | 0 | 0 | 0 |
| E-3 |  |  | parts | 0 | 0 | 0 | 0 | 9 | 0 |
| E-4 |  |  | parts | 0 | 0 | 0 | 0 | 0 | 9 |
| E-5 |  |  | parts | 0 | 0 | 0 | 0 | 0 | 0 |
| F-1 |  |  | parts | 20 | 20 | 20 | 20 | 20 | 20 |
| F-2 |  |  | parts | 0 | 0 | 0 | 0 | 0 | 0 |
| F-3 |  |  | parts | 0 | 0 | 0 | 0 | 0 | 0 |
| F-4 |  |  | parts | 0 | 0 | 0 | 0 | 0 | 0 |
| G |  |  | parts | 0.5 | 0.5 | 0.5 | 0.5 | 0.5 | 0.5 |
| Evaluation | Charpy impact strength |  | kJ/m$^2$ | 10 | 10 | 12 | 11 | 11 | 10 |
|  | Flexural strength |  | MPa | 200 | 209 | 225 | 200 | 208 | 208 |
|  | Flexural modulus |  | MPa | 11000 | 12500 | 12800 | 12400 | 12500 | 12500 |
|  | Flame retardancy |  | — | ◯ | ◯ | ◎ | ◎ | ◎ | ◎ |
|  | Moldability | Mold surface shape | — | M-3 | M-3 | M-3 | M-3 | M-3 | M-3 |
|  |  | Evaluation | — | ◯ | ◯ | ◯ | ◯ | ◯ | ◯ |
|  | Surface condition of molded article | Ten point average roughness | μm | 13.4 | 13.7 | 14.2 | 14.0 | 14.4 | 14.5 |
|  |  | Grossiness (60°) | % | 1.2 | 1.3 | 1.5 | 1.4 | 1.6 | 1.7 |
|  |  | Surface appearance | — | X | X | ◯ | ◯ | ◯ | ◯ |
|  |  | Weld appearance | — | X | X | ◯ | ◯ | ◯ | ◯ |

TABLE 2

| Example No. |  |  |  |  | 13 | 14 | 15 | 16 | 17 | 18 | 19 |
|---|---|---|---|---|---|---|---|---|---|---|---|
| C | A |  |  | % | 90 | 90 | 90 | 90 | 90 | 90 | 90 |
|  | B | B1-1 |  | % | 0 | 10 | 0 | 0 | 0 | 0 | 0 |
|  |  | B1-2 |  | % | 0 | 0 | 10 | 0 | 0 | 0 | 0 |
|  |  | B1-3 |  | % | 0 | 0 | 0 | 10 | 0 | 0 | 0 |
|  |  | B1-4 |  | % | 10 | 0 | 0 | 0 | 10 | 10 | 10 |
| D-1 |  |  |  | parts | 105 | 105 | 105 | 105 | 101 | 61 | 70 |
| D-2 |  |  |  | parts | 0 | 0 | 0 | 0 | 0 | 0 | 0 |
| D-3 |  |  |  | parts | 0 | 0 | 0 | 0 | 0 | 0 | 0 |
| D-4 |  |  |  | parts | 0 | 0 | 0 | 0 | 0 | 0 | 0 |
| E-1 |  |  |  | parts | 0 | 0 | 0 | 0 | 0 | 0 | 0 |
| E-2 |  |  |  | parts | 0 | 9 | 9 | 9 | 3 | 9 | 9 |
| E-3 |  |  |  | parts | 0 | 0 | 0 | 0 | 0 | 0 | 0 |
| E-4 |  |  |  | parts | 0 | 0 | 0 | 0 | 0 | 0 | 0 |
| E-5 |  |  |  | parts | 9 | 0 | 0 | 0 | 0 | 0 | 0 |
| F-1 |  |  |  | parts | 20 | 20 | 20 | 20 | 20 | 10 | 30 |
| F-2 |  |  |  | parts | 0 | 0 | 0 | 0 | 0 | 0 | 0 |
| F-3 |  |  |  | parts | 0 | 0 | 0 | 0 | 0 | 0 | 0 |
| F-4 |  |  |  | parts | 0 | 0 | 0 | 0 | 0 | 0 | 0 |
| G |  |  |  | parts | 0.5 | 0.5 | 0.5 | 0.5 | 0.5 | 0.5 | 0.5 |
| Evaluation | Charpy impact strength |  |  | kJ/m$^2$ | 9 | 11 | 11 | 11 | 12 | 15 | 10 |
|  | Flexural strength |  |  | MPa | 180 | 213 | 218 | 223 | 220 | 191 | 211 |
|  | Flexural modulus |  |  | MPa | 12600 | 12600 | 12500 | 12500 | 12800 | 9500 | 9800 |
|  | Flame retardancy |  |  | — | ◎ | ◯ | ◯ | ◯ | ◎ | ◯ | ◎ |
|  | Moldability | Mold surface shape |  | — | M-3 | M-3 | M-3 | M-3 | M-3 | M-3 | M-3 |
|  |  | Evaluation |  | — | ◯ | ◯ | ◯ | ◯ | ◯ | ◯ | ◯ |
|  | Surface condition of molded article | Ten point average roughness |  | μm | 14.5 | 13.9 | 14.1 | 14.2 | 14.4 | 13.8 | 14.5 |
|  |  | Grossiness (60°) |  | % | 1.7 | 1.3 | 1.4 | 1.4 | 1.4 | 1.4 | 1.7 |
|  |  | Surface appearance |  | — | ◯ | ◯ | ◯ | ◯ | ◯ | ◯ | ◯ |
|  |  | Weld appearance |  | — | ◯ | ◯ | ◯ | ◯ | ◯ | ◯ | ◯ |

| Example No. |  |  |  |  | 20 | 21 | 22 | 23 | 24 | 25 |
|---|---|---|---|---|---|---|---|---|---|---|
| C | A |  |  | % | 90 | 90 | 90 | 90 | 90 | 90 |
|  | B | B1-1 |  | % | 0 | 0 | 0 | 0 | 0 | 0 |
|  |  | B1-2 |  | % | 0 | 0 | 0 | 0 | 0 | 0 |

TABLE 2-continued

|  |  |  |  |  |  |  |  |  |  |
|---|---|---|---|---|---|---|---|---|---|
|  |  | B1-3 | % | 0 | 0 | 0 | 0 | 0 | 0 |
|  |  | B1-4 | % | 10 | 10 | 10 | 10 | 10 | 10 |
| D-1 |  |  | parts | 75 | 65 | 65 | 65 | 129 | 0 |
| D-2 |  |  | parts | 0 | 0 | 0 | 0 | 0 | 105 |
| D-3 |  |  | parts | 0 | 0 | 0 | 0 | 0 | 0 |
| D-4 |  |  | parts | 0 | 0 | 0 | 0 | 0 | 0 |
| E-1 |  |  | parts | 0 | 0 | 0 | 0 | 0 | 0 |
| E-2 |  |  | parts | 9 | 9 | 9 | 9 | 9 | 9 |
| E-3 |  |  | parts | 0 | 0 | 0 | 0 | 0 | 0 |
| E-4 |  |  | parts | 0 | 0 | 0 | 0 | 0 | 0 |
| E-5 |  |  | parts | 0 | 0 | 0 | 0 | 0 | 0 |
| F-1 |  |  | parts | 40 | 0 | 0 | 0 | 20 | 20 |
| F-2 |  |  | parts | 0 | 20 | 0 | 0 | 0 | 0 |
| F-3 |  |  | parts | 0 | 0 | 20 | 0 | 0 | 0 |
| F-4 |  |  | parts | 0 | 0 | 0 | 20 | 0 | 0 |
| G |  |  | parts | 0.5 | 0.5 | 0.5 | 0.5 | 0.5 | 0.5 |
| Evaluation | Charpy impact strength |  | kJ/m$^2$ | 10 | 14 | 14 | 13 | 10 | 21 |
|  | Flexural strength |  | MPa | 218 | 203 | 204 | 200 | 244 | 247 |
|  | Flexural modulus |  | MPa | 10000 | 9700 | 9700 | 9700 | 13400 | 13400 |
|  | Flame retardancy |  | — | ○ | ◎ | ◎ | ○ | ○ | ○ |
|  | Moldability | Mold surface shape | — | M-3 | M-3 | M-3 | M-3 | M-3 | M-3 |
|  |  | Evaluation | — | ○ | ○ | Δ | ○ | Δ | ○ |
|  | Surface condition of molded article | Ten point average roughness | μm | 14.5 | 14.3 | 14.5 | 14.0 | 14.0 | 14.3 |
|  |  | Grossiness (60°) | % | 1.7 | 1.6 | 1.7 | 1.5 | 1.3 | 1.5 |
|  |  | Surface appearance | — | ○ | ○ | ○ | ○ | ○ | ○ |
|  |  | Weld appearance | — | ○ | ○ | ○ | ○ | ○ | ○ |

TABLE 3

|  |  |  |  | Comparative Example No. |  |  |  |  |  |  |  |  |  |  |
|---|---|---|---|---|---|---|---|---|---|---|---|---|---|---|
|  |  |  |  | 1 | 2 | 3 | 4 | 5 | 6 | 7 | 8 | 9 | 10 | 11 |
| C | A |  | % | 90 | 45 | 95 | 90 | 90 | 90 | 90 | 90 | 90 | 90 | 90 |
|  | B | B1-1 | % | 0 | 0 | 0 | 0 | 0 | 0 | 0 | 0 | 0 | 0 | 0 |
|  |  | B1-2 | % | 0 | 0 | 0 | 0 | 0 | 0 | 0 | 0 | 0 | 0 | 0 |
|  |  | B1-3 | % | 0 | 0 | 0 | 0 | 0 | 0 | 0 | 0 | 0 | 0 | 0 |
|  |  | B1-4 | % | 10 | 55 | 5 | 10 | 10 | 10 | 10 | 10 | 10 | 10 | 10 |
| D-1 |  |  | parts | 105 | 105 | 105 | 125 | 115 | 100 | 160 | 0 | 0 | 0 | 55 |
| D-2 |  |  | parts | 0 | 0 | 0 | 0 | 0 | 0 | 0 | 0 | 0 | 0 | 0 |
| D-3 |  |  | parts | 0 | 0 | 0 | 0 | 0 | 0 | 0 | 105 | 65 | 0 | 0 |
| D-4 |  |  | parts | 0 | 0 | 0 | 0 | 0 | 0 | 0 | 0 | 0 | 65 | 0 |
| E-1 |  |  | parts | 0 | 0 | 0 | 0 | 0 | 0 | 0 | 0 | 0 | 0 | 0 |
| E-2 |  |  | parts | 0 | 9 | 9 | 9 | 21 | 0 | 9 | 9 | 9 | 9 | 9 |
| E-3 |  |  | parts | 0 | 0 | 0 | 0 | 0 | 0 | 0 | 0 | 0 | 0 | 0 |
| E-4 |  |  | parts | 0 | 0 | 0 | 0 | 0 | 0 | 0 | 0 | 0 | 0 | 0 |
| E-5 |  |  | parts | 0 | 0 | 0 | 0 | 0 | 0 | 0 | 0 | 0 | 0 | 0 |
| F-1 |  |  | parts | 20 | 20 | 20 | 45 | 20 | 20 | 20 | 20 | 20 | 20 | 20 |
| F-2 |  |  | parts | 0 | 0 | 0 | 0 | 0 | 0 | 0 | 0 | 0 | 0 | 0 |
| F-3 |  |  | parts | 0 | 0 | 0 | 0 | 0 | 0 | 0 | 0 | 0 | 0 | 0 |
| F-4 |  |  | parts | 0 | 0 | 0 | 0 | 0 | 0 | 0 | 0 | 0 | 0 | 0 |
| G |  |  | parts | 0.5 | 0.5 | 0.5 | 0.5 | 0.5 | 0.5 | 0.5 | 0.5 | 0.5 | 0.5 | 0.5 |
| DIACARNA-30 |  |  | parts | 0 | 0 | 0 | 0 | 0 | 0.6 | 0 | 0 | 0 | 0 | 0 |
| Evaluation | Charpy impact strength |  | parts | 7 | 8 | 13 | 9 | 11 | 12 | 9 | 10 | 11 | 6 | 13 |
|  | Flexural strength |  | MPa | 162 | 194 | 218 | 215 | 200 | 140 | 244 | 209 | 194 | 124 | 198 |
|  | Flexural modulus |  | MPa | 12900 | 10300 | 11900 | 9000 | 12500 | 12600 | 13400 | 12400 | 9600 | 9300 | 8900 |
|  | Flame retardancy |  | — | ◎ | X | ◎ | X | ○ | ○ | X | ◎ | ◎ | ◎ | ○ |
|  | Moldability | Mold surface shape | — | M-3 | M-3 | M-3 | M-3 | M-3 | M-3 | M-3 | M-3 | M-3 | M-3 | M-3 |
|  |  | Evaluation | — | ○ | ○ | X | ○ | X | ○ | X | ○ | ○ | ○ | ○ |
|  | Surface condition of molded article | Ten point average roughness | μm | 13.9 | 13.2 | — | 14.5 | — | 13.9 | — | 14.3 | 14.5 | 14.5 | 14.5 |
|  |  | Grossiness (60°) | % | 1.3 | 1.1 | — | 1.7 | — | 1.3 | — | 1.5 | 1.6 | 1.6 | 1.7 |
|  |  | Surface appearance | — | X | X | — | ○ | — | X | — | ○ | ○ | ○ | ○ |
|  |  | Weld appearance | — | X | X | — | ○ | — | X | — | ○ | ○ | ○ | ○ |

As is clear from the Tables 1 and 2, the reinforced thermoplastic resin compositions of Examples 1 to 25 exhibited not only superior moldability, but also superior rigidity, impact strength, mechanical strength and frame retardancy of the resulting molded articles.

In particular, the reinforced thermoplastic resin compositions of Examples 1, 10 to 12 in which the glycidyl ether unit-containing polymers (E-1) to (E-4) having a weight average molecular weight of at least 3,000 were respectively used exhibited excellent Charpy impact strength and mechanical strength of the resulting molded article, as compared to the reinforced thermoplastic resin composition of Example 13 in which the glycidyl ether unit-containing polymer (E-5) having a weight average molecular weight of less than 3,000 was used.

The reinforced thermoplastic resin composition of Examples 6, 21 and 22 in which the phosphoric acid ester-based flame-retardant agents (F-1) to (F-3) having a weight average molecular weight of no more than 686 were respectively used exhibited excellent flame retardancy of the resulting molded article, as compared to the reinforced thermoplastic resin composition of Example 23 in which the phosphoric acid ester-based flame-retardant agent (F-4) having a weight average molecular weight of greater than 686 was used.

The reinforced thermoplastic resin composition of Examples 6, 21 and 23 in which the phosphoric acid ester-based flame-retardant agents (F-1), (F-2) and (F-4) having a weight average molecular weight of greater than 326 were respectively used exhibited excellent moldability, as compared to the reinforced thermoplastic resin composition of Example 22 in which the phosphoric acid ester-based flame-retardant agent (F-3) having a weight average molecular weight of 326 was used.

The reinforced thermoplastic resin composition of Example 25 in which the glass fiber (D-2) having the ratio of major axis to minor axis of the cross-sectional surface of the fiber (represented by [major axis]/[minor axis]) of 4 was used exhibited excellent Charpy impact strength, mechanical strength and rigidity of the resulting molded article, as compared to the reinforced thermoplastic resin composition of Example 3 in which the glass fiber (D-1) having the ratio of major axis to minor axis of 1 was used.

Further, with respect to the molded articles obtained by using mold having mold surface shapes 1 (M-1) to 4 (M-4) and using the reinforced thermoplastic resin compositions of Examples 1 to 4, 6 and 9 to 25, the surface appearance was improved, and the weld appearance was hardly visually recognized.

With respect to the molded article obtained in Example 5, because the mold having mold surface shape 5 (M-5) was used, the Rz value of the surface was 0.3 μm, the Gs (60°) value was 43.0% and thus, the weld appearance was deteriorated.

With respect to the molded articles obtained in Examples 7 and 8, because the amount of the graft copolymer (B) within the main resin component (C) was relatively excess, the surface appearance and the weld appearance were deteriorated.

On the other hand, as is clear from Table 3, the reinforced thermoplastic resin compositions of Comparative Examples 1 and 6 in which the glycidyl ether unit-containing polymer was not contained exhibited deteriorated Charpy impact strength and mechanical strength of the resulting molded article. Further, the surface appearance and weld appearance of the resulting molded article were also deteriorated.

The reinforced thermoplastic resin composition of Comparative Example 2 in which the amount of the polycarbonate resin (A) within the main resin component (C) was 45%, which was too low, and the amount of the graft copolymer (B) was 55%, which was too large, exhibited deteriorated Charpy impact strength and flame retardancy of the resulting molded article. Further, the surface appearance and weld appearance of the resulting molded article were also deteriorated.

The reinforced thermoplastic resin compositions of Comparative Example 3 in which the amount of the polycarbonate resin (A) within the main resin component (C) was 95%, which was too large, and the amount of the graft copolymer (B) was 5%, which was too low, exhibited deteriorated moldability. Therefore, the surface condition of the molded article was not evaluated.

The reinforced thermoplastic resin compositions of Comparative Example 4 in which the amount of the phosphoric acid ester-based flame-retardant agent (F) was 45 parts by weight, which was too large, exhibited deteriorated Charpy impact strength and flame retardancy of the resulting molded article.

The reinforced thermoplastic resin compositions of Comparative Example 5 in which the amount of the glycidyl ether unit-containing polymer (E) was 21 parts by weight, which was too large, exhibited deteriorated moldability. Therefore, the surface condition of the molded article was not evaluated.

The reinforced thermoplastic resin compositions of Comparative Example 7 in which the amount of the glass fiber (D) was 160 parts by weight, which was too large, exhibited deteriorated moldability. Therefore, the surface condition of the molded article was not evaluated. Further, the flame retardancy of the resulting molded article was deteriorated.

The reinforced thermoplastic resin compositions of Comparative Examples 8 to 10 in which the glass fiber surface-treated with a water-soluble epoxy or a water-soluble polyolefin, exhibited deteriorated Charpy impact strength and mechanical strength of the resulting molded article.

The reinforced thermoplastic resin compositions of Comparative Example 11 in which the amount of the glass fiber (D) was 55 parts by weight, which was too low, exhibited deteriorated rigidity of the resulting molded article.

INDUSTRIAL APPLICABILITY

The reinforced thermoplastic resin composition of the present invention exhibits excellent moldability, and also being capable of providing high rigidity, impact resistance, mechanical strength and flame retardancy of the resulting molded article.

The molded article of the present invention has high rigidity, impact resistance, mechanical strength and flame retardancy.

The invention claimed is:

1. A reinforced thermoplastic resin composition comprising:
    50 to 90% by weight of a polycarbonate resin (A);
    10 to 50% by weight of a graft copolymer (B) in which a polymer (B2) including an aromatic alkenyl compound monomer unit (a) and a vinyl cyanide compound monomer unit (b) is grafted to a rubber polymer (B1), provided that a total amount of the polycarbonate resin (A) and the graft copolymer (B) accounts for 100% by weight;
    61 to 129 parts by weight of a glass fiber (D) which has been surface-treated with a water-soluble polyurethane, relative to the total of 100 parts by weight of the polycarbonate resin (A) and the graft copolymer (B);
    0.5 to 20 parts by weight of a glycidyl ether unit-containing polymer (E); and 10 to 40 parts by weight of a phosphoric acid ester-based flame-retardant agent (F).

2. The reinforced thermoplastic resin composition according to claim 1, wherein the phosphoric acid ester-based flame retardant (F) has a weight average molecular weight of greater than 326 and not more than 686.

3. A molded article formed through molding and processing of the reinforced thermoplastic resin composition according to claim 1.

4. The molded article according to claim 3, wherein
   at least part of a surface of the molded article has a concavo-convex shape having a ten-point average roughness of 0.5 to 40 μm defined in accordance with JIS B 0601, and having a surface glossiness at an incidence angle of 60° of 0.5 to 20% defined in accordance with JIS Z 8741.

5. The molded article formed through molding and processing of the reinforced thermoplastic resin composition according to claim 2.

* * * * *